May 14, 1963 L. P. JULIEN 3,089,512
AUTOMATIC MECHANISM OPERATED BY A PRE-SET PRESSURE
Filed June 10, 1960
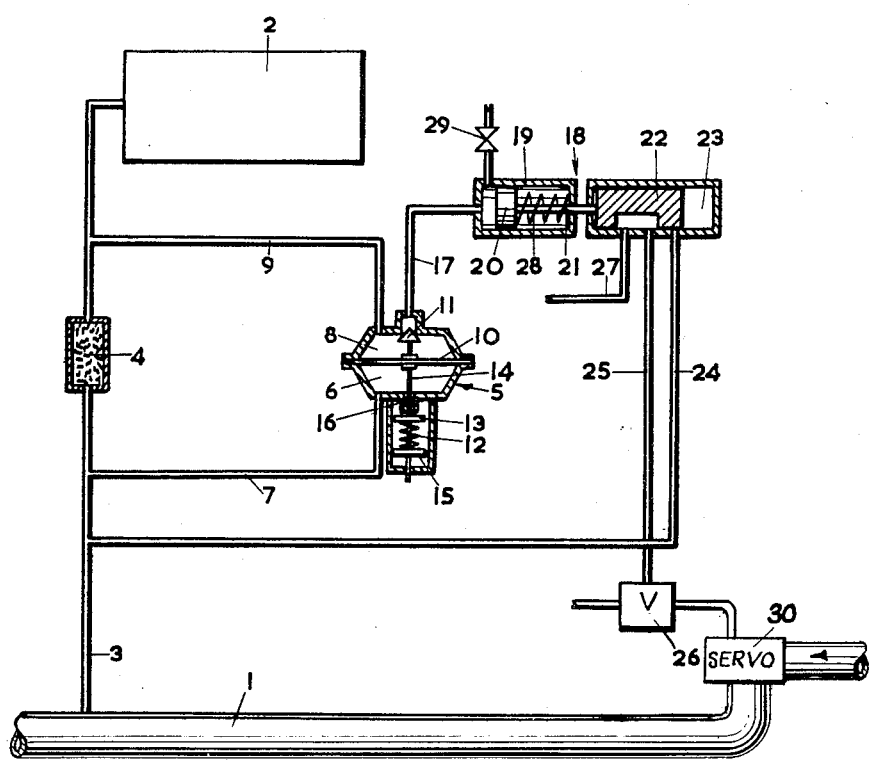
INVENTOR
LOUIS PAUL JULIEN United States Patent Office 3,089,512
Patented May 14, 1963

3,089,512
AUTOMATIC MECHANISM OPERATED BY
A PRE-SET PRESSURE
Louis Paul Julien, 104 Rue Kleber, Marseille, France
Filed June 10, 1960, Ser. No. 35,259
Claims priority, application France Apr. 7, 1960
2 Claims. (Cl. 137—460)

Devices generally used for the control of safety-valves and safety-cocks on gas and other circuits are based on the principle of measuring a differential pressure created on each side of a diaphragm or needle-valve arrangement installed between the circuit in which the pressure is to be controlled and a reservoir of a predetermined volume.

This differential pressure acts on each side of a diaphragm and in opposition to a regulating-spring.

When the operational pressure in the circuit varies, the differential pressure causes the diaphragm to undergo deformation against the regulating-spring and usually actuates a rod or other coupling member, through suitable control gear, to operate some further device to either boost or relieve the pressure in the circuit as required.

However, in order to obtain energy adequate to cause this action, the differential pressure must reach a sufficient power, which means that a diaphragm with a very small orifice has to be provided. It is this requirement which causes the apparatus to fail, owing to obstruction by particles in suspension or other substances, so that these devices are subject to serious disadvantages in practice.

The purpose of the present invention is to provide a control device sensitive to a pre-set pressure and pressure-drop, which overcomes the above disadvantage.

According to the present invention, an automatic mechanism for operation by a predetermined pressure variation, comprises a source of fluid pressure taken from the circuit to be controlled, a reservoir of predetermined volume coupled with said source of fluid pressure, a porous barrier between said source of fluid pressure and said reservoir, a differential pressure valve having two chambers with a flexible diaphragm forming a common wall, a first of said chambers being connected to the fluid pressure source and the second of said chambers being connected to said reservoir, valve means connecting the second of said chambers to a fluid pressure operable relay assembly and including a movable valve member spring-loaded into closing position and coupled to the diaphragm, said relay assembly including a fluid-operated cylinder and piston device arranged to cause actuation of valve means in said circuit to be controlled, whereby a pressure drop in said circuit causes the greater pressure then prevalent in the reservoir to open the spring-loaded valve in said second chamber whereafter said greater pressure is transmitted to said relay assembly to cause actuation of the valve in the circuit to relieve the pressure therein.

One embodiment of the present invention is hereinafter more particularly described, by way of example, with reference to the accompanying drawing showing a circuit diagram of the device.

In the drawing, the circuit in which the pressure is to be controlled is indicated at 1. The device of the present invention includes a reservoir 2 coupled to said circuit 1 from which a pressure source is taken through conduit 3. A porous barrier 4 is provided between the circuit 1 and the reservoir 2, in the conduit 3, said barrier being in the form of a chamber filled with fritted metal or other porous material.

A differential pressure valve indicated generally at 5 includes two chambers, a first chamber 6 being connected to the fluid pressure source 3 through conduit 7 and the second chamber 8 being connected to the reservoir 2 through conduit 9. The two chambers are separated by a flexible diaphragm 10 forming a common wall.

The device 5 further includes a valve 11 spring-loaded into closing position by means of spring 12 acting between a collar 13 on the valve rod 14 and a fixed seating 15 through which the rod 14 is free to move. Packing 16 is provided about the rod 14 to maintain the chamber 6 fluid-tight. The valve rod 14 is secured to the diaphragm 10 in order that downward movement of said diaphragm will unseat the valve 11, as hereinafter explained.

The valve 11 normally closes a conduit 17 connecting said second chamber 8 with a fluid pressure operable relay assembly indicated generally at 18. The relay assembly 18 includes a cylinder 19 and piston 20 slidable therein, the piston rod 21 being connected to a slide-valve member 22 operable within a chamber 23. The slide-valve member 22 is arranged to normally close a conduit 24 connected to the fluid pressure source 3 and to provide communication between a conduit 25 connected to a fluid-operable valve 26 and a further conduit 27 open to the atmosphere. The piston 20 and slide-valve member 22 are normally maintained in the position shown by a spring 28 acting on the piston 20. A further bleed valve 29 is provided on the cylinder 19, the purpose of which valve is hereinafter explained.

The operation of the mechanism of the present invention is as follows:

Whilst the desired and predetermined pressure is maintained in the circuit 1, the conduit 3 allows the same pressure to obtain in reservoir 2, the porous barrier 4 acting as a throttle to ensure that pressure is initially greater in the circuit 1, this greater pressure being transmitted through conduit 7 to chamber 6 so that the diaphragm 10 is urged upwardly (there being a lower pressure, at this stage, in the conduit 9) to maintain the valve 11 in its closed position. Eventually, the pressure in the reservoir 2 will become equal to that in the circuit 1, but the valve 11 will remain closed due to the spring-loading by spring 12.

If the pressure in circuit 1 now drops, the barrier 4 will cause a differential pressure in the valve device 5, there now being a lower pressure in chamber 6 than in chamber 8. The higher pressure in chamber 8 (transmitted from the reservoir 2 through conduit 9) will cause the diaphragm 10 to deform downwardly, thus opening the valve 11. The fluid in chamber 8 and reservoir 2 is now free to pass into conduit 17 and will act upon the piston 20 to move it against its spring 28, the piston rod 21 transmitting this movement of the piston to the slide-valve member 22. Movement of the slide-valve member 22 will primarily close the conduit 27 to atmosphere and then open conduit 24, so that conduits 24 and 25 will then be in communication, whereby fluid from the circuit 1 will cause actuation of the valve 26 in a direction to actuate a servo 30 arranged to relieve the pressure of fluid being supplied to the circuit 1.

When the pressure of the fluid in circuit 1 again becomes equal to the pressure obtaining in reservoir 2, the chambers 6 and 8 of device 5 will be subjected to equal pressures, and the valve 11 will close, whereafter the piston 20 will be returned to its initial position by the spring 28 (pressure in conduit 17 being bled off through valve 29) thus causing the slide-valve member 22 to return to its initial position in which the conduit 24 is closed and the conduit 25 is re-connected to atmosphere through conduit 27. This allows valve 26 to return to its normal position, thus restoring the servo 30 to its original operating condition.

It will thus be appreciated that a drop in fluid pressure in the circuit 1 will immediately cause valve 11 to open, due to the differential pressure then prevalent on each side of diaphragm 10, whereafter the relay assembly 18 operates to cause actuation of the valve 26, the operation therefore being entirely automatic.

The barrier 4 acts as a throttle between the circuit 1 and the reservoir 2 and, being filled with fritted metal or similar porous material, does not become blocked by impurities in the fluid, as would a small orifice.

I claim:

1. An automatic mechanism for operation by a predetermined pressure variation, comprising a source of fluid pressure taken from the circuit to be controlled, valve means associated with said circuit, a reservoir of predetermined volume coupled with said source of fluid pressure, a porous barrier between said source of fluid pressure and said reservoir, a differential presssure valve having two chambers with a flexible diaphragm forming a common wall, a first of said chambers being connected to the fluid pressure source and the second of said chambers being connected to said reservoir, valve means connecting the second of said chambers to a fluid pressure operable relay assembly and including a movable valve member spring-loaded into closing position and coupled to the diaphragm, said relay assembly including a fluid-operated cylinder and piston device arranged to cause actuation of said valve means arranged to relieve pressure in said circuit to be controlled, whereby a pressure drop in said circuit causes the greater pressure then prevalent in the reservoir to open the spring-loaded valve in said second chamber whereafter said greater pressure is transmitted to said relay assembly to cause actuation of the valve means to relieve the pressure therein.

2. An automatic mechanism for operation by a predetermined pressure variation, comprising a source of fluid pressure taken from the circuit to be controlled, valve means associated with said circuit, a reservoir of predetermined volume coupled with said source of fluid pressure, a porous barrier between said source of fluid pressure and said reservoir, a differential pressure valve having two chambers with a flexible diaphragm forming a common wall, a first of said chambers being connected to the fluid pressure source and the second of said chambers being connected to said reservoir, valve means connecting the second of said chambers to a fluid pressure operable relay assembly and including a movable valve member spring-loaded into closing position and coupled to the diaphragm, said relay assembly including a fluid-operated cylinder and piston device coupled to a slide-valve member, said slide-valve member controlling a secondary circuit from said valve means arranged to relieve pressure in said circuit to be controlled to connect said secondary circuit normally with atmosphere but to connect said secondary circuit with said source of fluid pressure when said relay assembly is operated, whereby a pressure drop in said circuit to be controlled causes the greater pressure then prevalent in the reservoir to open the spring-loaded valve in said second chamber whereafter said greater pressure is transmitted to said relay assembly to actuate said slide-valve member thereby causing said valve means in said circuit to be controlled to be connected with said source of fluid pressure, thus causing said valve means to be actuated to allow relieving of the pressure in the circuit.

References Cited in the file of this patent

UNITED STATES PATENTS

| 1,745,059 | Rush | Jan. 28, 1930 |
| 1,887,322 | Nettleton | Nov. 8, 1932 |
| 2,426,212 | Hedene | Aug. 26, 1947 |
| 2,692,581 | Ziebolz | Oct. 26, 1954 |